No. 779,335. PATENTED JAN. 3, 1905.
A. J. WHITE.
WHEEL TIRE.
APPLICATION FILED MAY 10, 1904.

Witnesses
Jesse A. Hoover
Ellen L. White

Inventor
Alfred J. White

No. 779,335.  
Patented January 3, 1905.

UNITED STATES PATENT OFFICE.

ALFRED J. WHITE, OF AKRON, OHIO.

WHEEL-TIRE.

SPECIFICATION forming part of Letters Patent No. 779,335, dated January 3, 1905.

Application filed May 10, 1904. Serial No. 207,288.

*To all whom it may concern:*

Be it known that I, ALFRED J. WHITE, a citizen of the United States, residing at Akron, in the county of Summit and State of Ohio, have invented certain new and useful Improvements in Wheel-Tires; and I do hereby declare the following to be a full, clear, and exact description of the same, reference being had to the accompanying drawings, forming a part of this specification, and to the letters of reference marked thereon.

This invention relates to improvements in tires for vehicle-wheels, and particularly to what are known as "clencher-tires;" and it has for its object to so construct the tire that it may be readily attached or removed from the wheel.

To these ends the invention consists in certain novel details of construction and combinations and arrangements of parts, all as will be now described, and the particular features of novelty pointed out in the claims.

Figure 1:
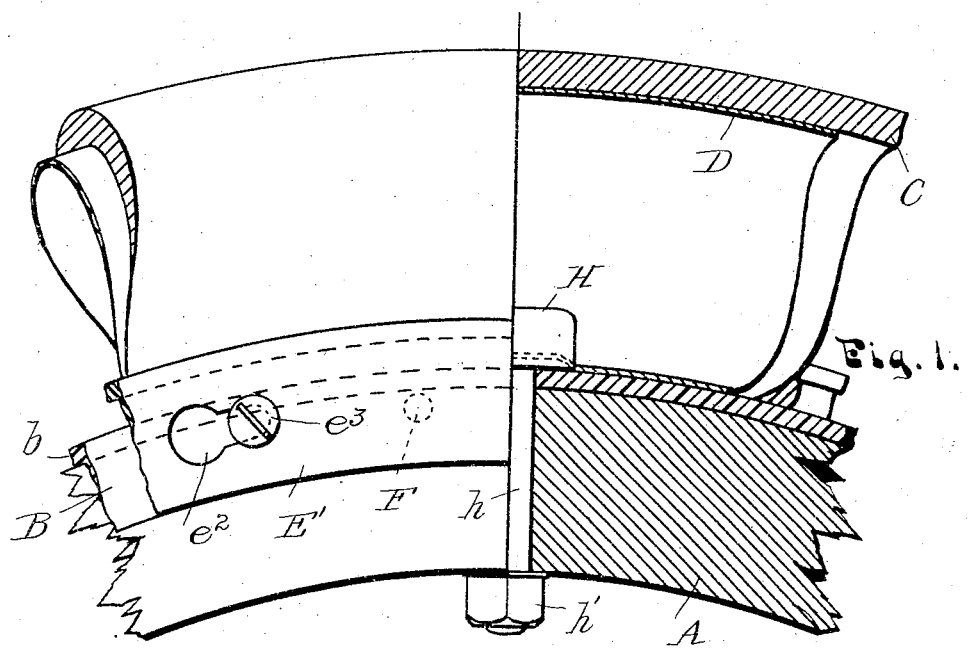
Figure 2:
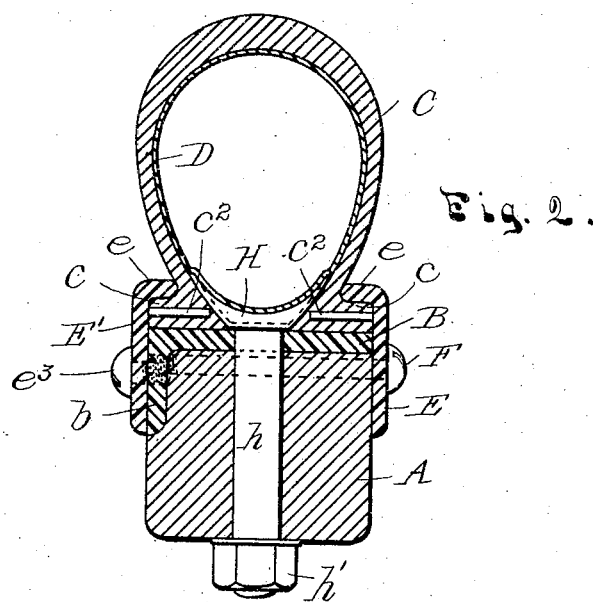

In the accompanying drawings, wherein is illustrated the preferred embodiment of the invention, Figure 1 is a view, partly in side elevation and partly in section, showing a tire construction according to the present invention. Fig. 2 is a cross-section.

Similar letters of reference in both figures indicate like parts.

Referring to the drawings, the letter A represents the felly, preferably of wood and having a flat upper face. Fitted to the flat face of the felly is an iron rim or tire B, formed with an inwardly-extending flange $b$, fitting flush with the side of the felly, as shown clearly in Fig. 2.

The cushioning-tire C is formed, preferably, of rubber or other suitable material and of any suitable shape, being shown as substantially elliptical in cross-section. The tire is preferably divided or separated longitudinally on its inner side, and the base portions thus formed are provided with flanges or shoulders $c\,c$. Within this outer tire C is an inner inflatable tire or tube D, adapted to be inflated in any preferred manner.

To secure the tire C in position upon the rim, annular plates or rings E E' are provided upon each side of the felly B, having inturned ends $e\,e$, which are adapted to take over or engage the flanges or shoulders $c\,c$ of the base portions of the tire C, all as shown in Fig. 2. One of these side rings or plates, as E, is held fixed in place by means of screws F, passing through the felly B. In order, however, to facilitate the attachment and removal of the tire, the other plate, E', is made removable. For this purpose this plate E' is formed with keyhole-slots $e^2$, through which work small stud-screws $e^3$, said screws being screwed into the inwardly-extending flange $b$ of the rim B. To prevent the flanges or shoulders $c\,c$ of the base portions of the tire C from slipping out from beneath the inturned ends $e\,e$ of the plates or rings E E', a series of small pins $c^2$, of any suitable material, as steel, are inserted or embedded transversely in the flanges $c\,c$, thus stiffening them, so that there will be no liability of their slipping out accidentally, as will be understood. In order to hold the tire C centrally between the base portions, as well as to crowd said portions well under the inturned ends $e\,e$ of the annular plates E E', a series of bolts are employed, each having a flaring or wedge-shaped head H, the sides of which engage the tire between the separated base portions, the stem $h$ of the bolt extending through the felly and having a nut $h'$ upon its lower end, by means of which the head of the bolt may be tightened.

With this construction when it is desired to remove the tire for renewal or repair all that is necessary is to loosen the small stud-screws and move the annular plate E' until the enlarged portion of the slots come beneath the screw-heads, when the plate may be removed and the tire taken off, as will be understood. In replacing the tire one of the shouldered base portions is placed beneath the inturned end of the fixed annular plate. The movable plate is then slipped over the screws and moved until the narrow portions of the slots come below the screw-heads, when the screws are tightened and the plate held firmly in position.

It will be seen that the tire is simple in structure and of but few parts and can be readily removed or put on even by unskilled persons.

By having the metal tire formed with the inturned flange with the movable annular plate secured thereto this flange will act as a wear-plate or guard, and the wooden felly will be protected and not worn or defaced by the movements of the plate.

Although the tire has been described and illustrated as of the pneumatic type, it will be understood that the invention is not limited to this type alone.

Having thus described my invention, what I claim as new, and desire to secure by Letters Patent, is—

1. In a wheel the combination with the felly having a flat face, of a metallic rim fitted thereto and having an inwardly-extending flange lying flush with the side of the felly, the tire having the flanged base portions, an annular plate secured to one side of the felly having an inturned end or flange engaging the flanged base of the tire, an annular plate secured to the flange of the rim, but capable of longitudinal movement thereon, and having an inturned flange engaging the flanged base of the tire, and means for fastening said movable plate, substantially as described.

2. In a wheel the combination with the felly, of the metallic rim having an inwardly-extending flange lying flush with the side of the felly, the tire having separated flanged base portions, the fixed annular plate having an inturned flange engaging one of the shouldered base portions, a movable annular plate on the opposite side of the felly having an inturned flange engaging the other flanged base portion of the tire and having a series of keyhole-slots, the screws screwing into the flange of the rim, said screws adapted to work in the keyhole-slots, whereby the annular plate may be moved in one direction to permit its withdrawal and in the other direction to permit it to be secured in place, and a series of bolts having winged or flared heads adapted to engage the tire between the flanged base portions, and the nut for tightening said bolts; substantially as described.

3. In a wheel the combination with the felly, the metallic rim having the inwardly-extending flange, the tire having the separated flanged base portions, the series of transverse pins embedded in said base portions, the fixed annular plate having the inturned flange engaging one of the flanged base portions, the annular plate movable on the flange of the rim and having an inturned flange engaging the other flanged base portion, a series of bolts having flared or wedge-shaped heads engaging the tire between the separated base portions and the nut for tightening said bolt; substantially as described.

ALFRED J. WHITE.

Witnesses:
  CHAS. MOTZ,
  MILES HOFF.